Jan 6, 1931.  L. MARVIN  1,787,830
ATTACHMENT FOR SPECTACLES
Filed March 11, 1930
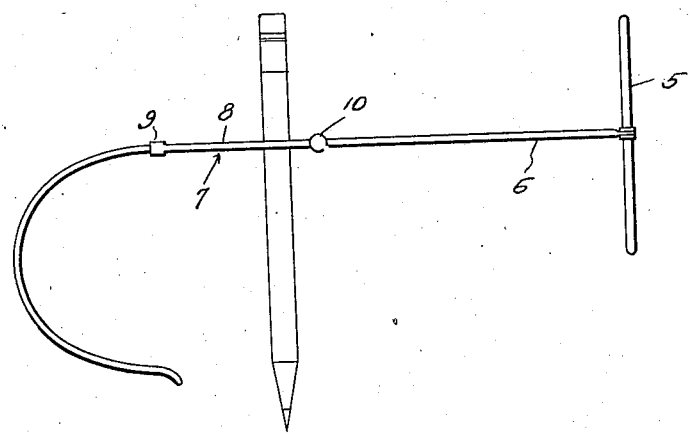
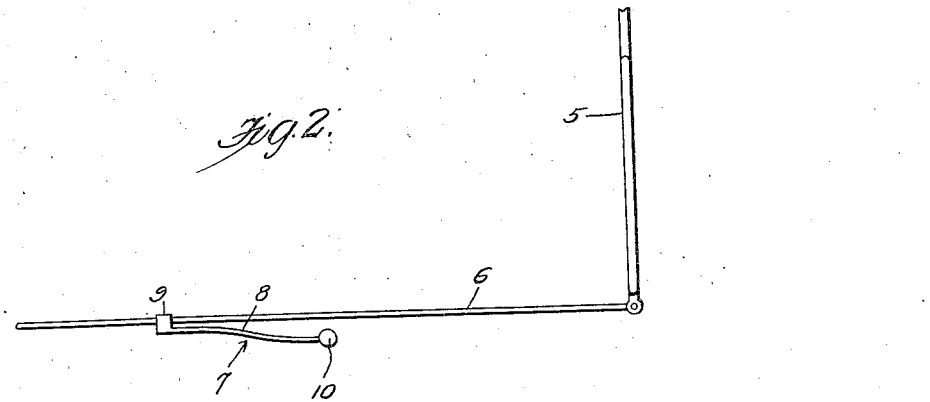
Inventor
Lloyd Marvin,
By Clarence A. O'Brien
Attorney Patented Jan. 6, 1931

1,787,830

UNITED STATES PATENT OFFICE

LLOYD MARVIN, OF IDAVILLE, INDIANA

ATTACHMENT FOR SPECTACLES

Application filed March 11, 1930. Serial No. 434,840.

This invention appertains to new and useful improvements in attachments for spectacles, and more particularly to a clamp for article holder for attachment to the usual ear pieces of spectacles.

An important object of the invention is to provide a retainer for spectacles which will permit the retention of a pencil or pen in an accessible position.

During the course of the following specification and claims, other important objects and advantages of the invention will readily become apparent to the reader.

In the drawings:—

Figure 1 represents a side elevational view of a spectacle frame showing the novel retainer on one ear piece thereof, and in the act of supporting a pencil.

Fig. 2 represents a fragmentary top plan view of a spectacle frame showing the retainer on the ear piece.

Referring to the drawings wherein like numerals designate like parts, it can be seen that numeral 5 represents an eye piece and numeral 6 one ear piece of a spectacle frame. The retainer for the ear piece is generally referred to by the numeral 7 in the drawings. This retainer comprises an elongated leaf spring 8 provided with ears 9 at one end, whereby the same is secured to the ear piece. The opposite or free end of the spring is provided with an enlargement or head 10, and when the leaf spring is secured by its ears 9 to the ear piece 6, the outer end portion thereof is preferably swung outwardly slightly in the manner shown.

Obviously, by engaging a pencil or pen between the ear piece and the leaf spring 8, the same cannot readily become displaced, as the tension of the leaf spring will clamp the pencil or pen in position against the ear piece, and any tendency of the pencil to slip outwardly by way of the free end of the leaf spring, will be intercepted by the head 10.

While the foregoing specification has set forth the invention in detail, it is to be understood that numerous changes in the shape, size, and materials, may be resorted to without departing from the spirit of the invention as claimed hereinafter.

Having thus described my invention, what I claim as new is:—

An attachment for spectacles comprising a leaf spring provided with a pair of ears at one end thereof adapted for clamped engagement with one ear piece of a spectacle, and a head at the opposite end of the leaf spring, said leaf spring being disposed longitudinally in the direction of the ear piece to which it is attached.

In testimony whereof I affix my signature.

LLOYD MARVIN.